Patented Feb. 18, 1930

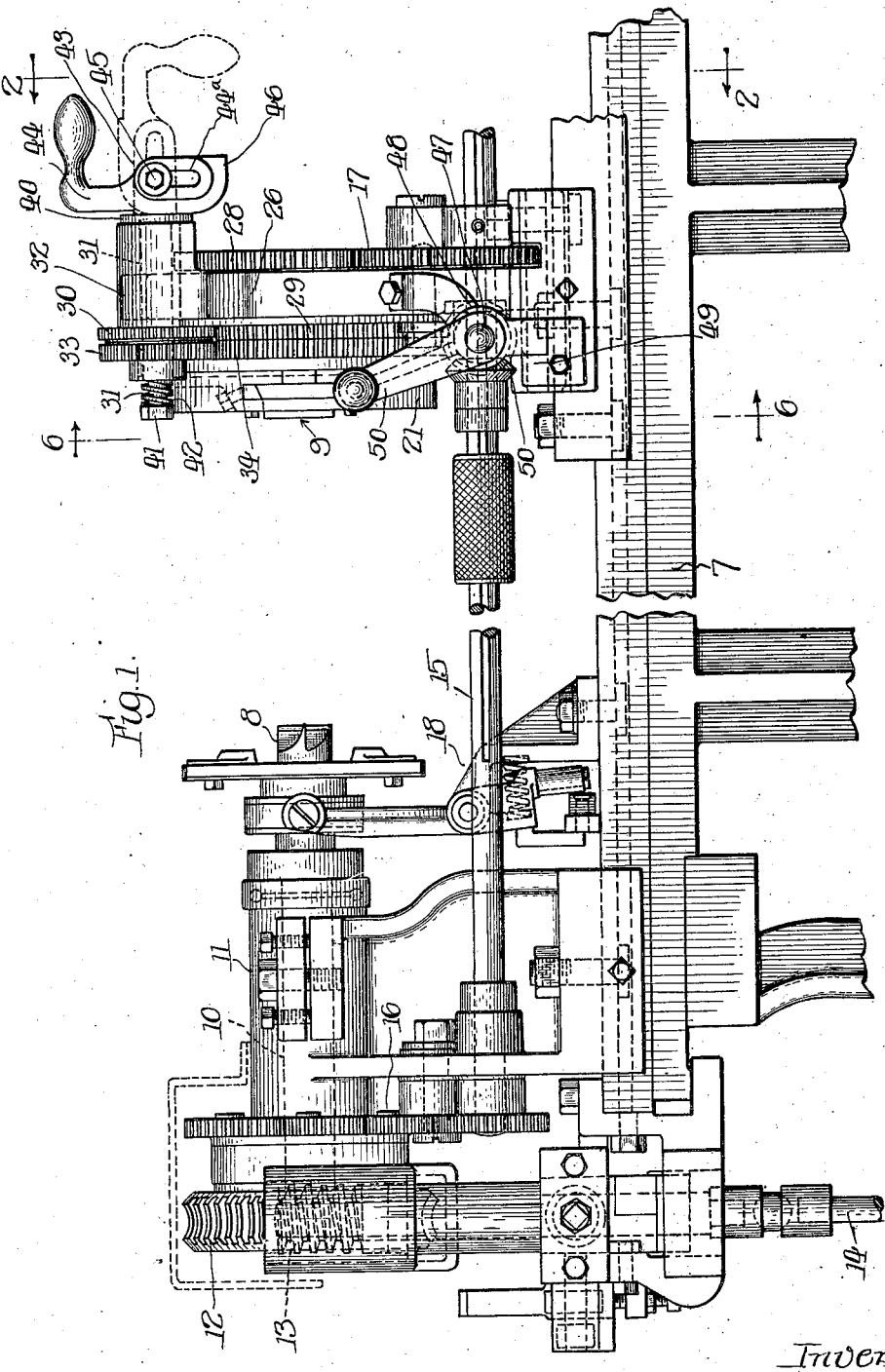

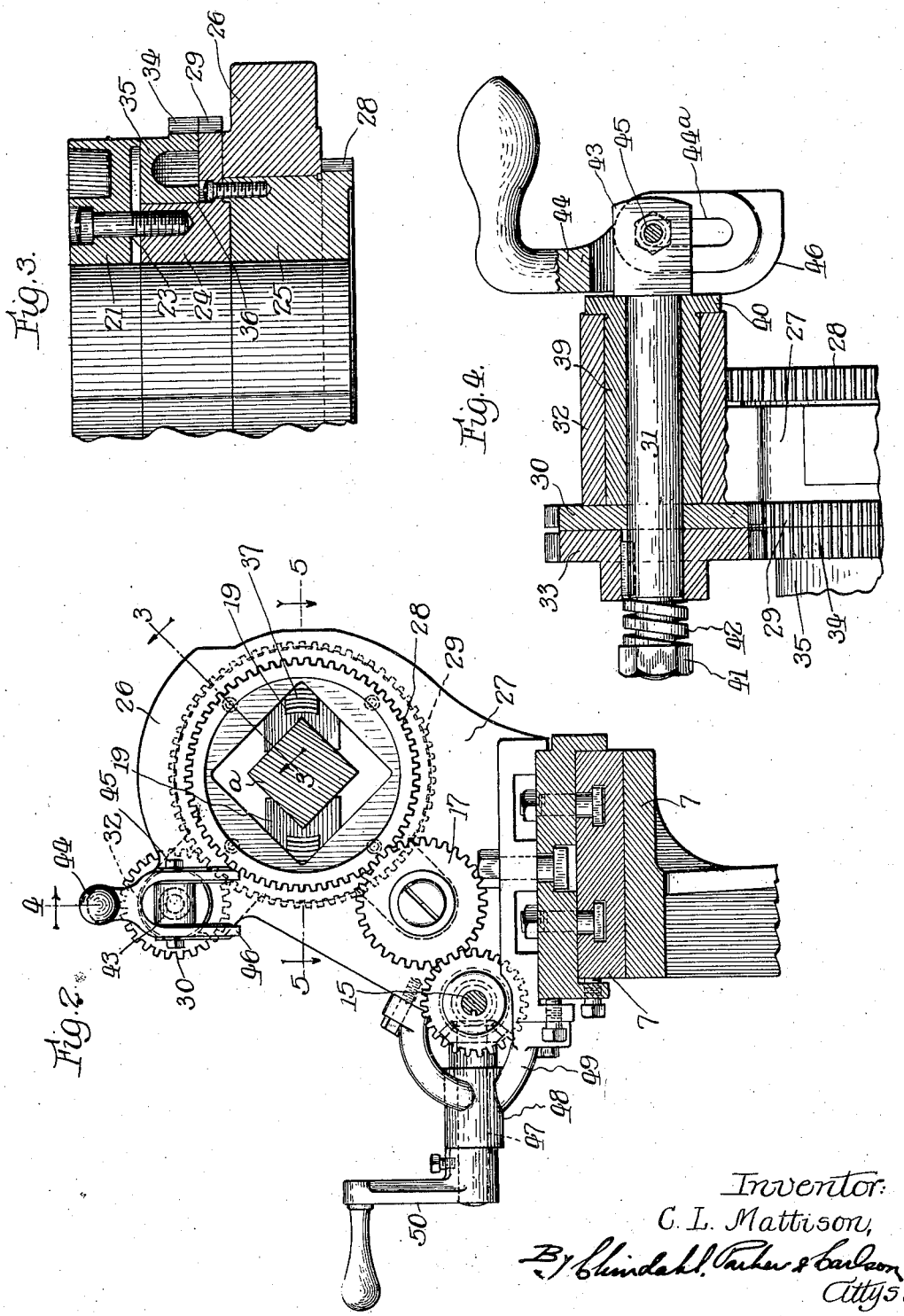

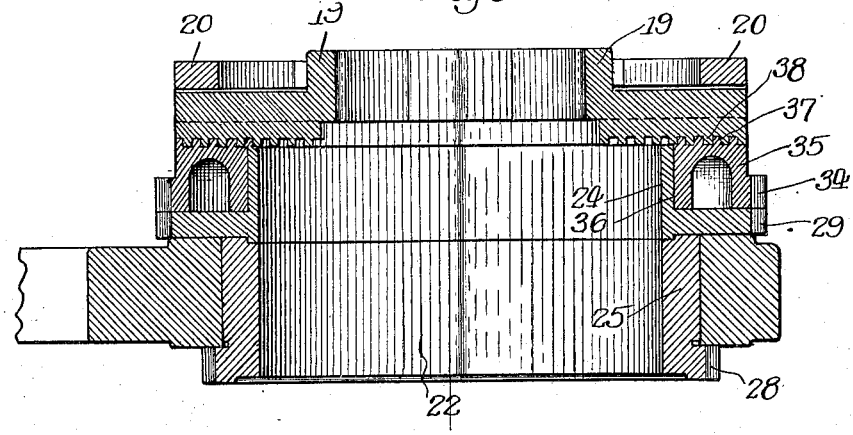
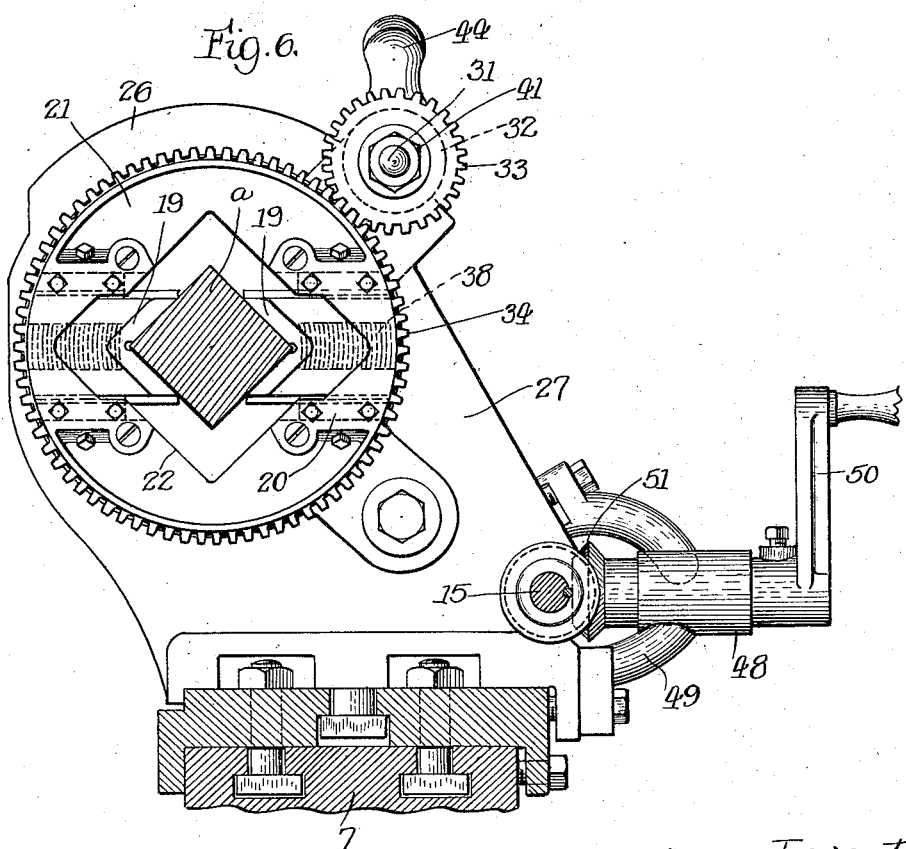

1,747,453

UNITED STATES PATENT OFFICE

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS

CHUCK-LOCKING DEVICE

Application filed March 24, 1924. Serial No. 701,274.

The invention has general reference to a wood turning lathe, but is directed more particularly to a means for locking the work-holding chuck of such a lathe.

Difficulty has been experienced in the use of wood working machines of the character indicated because of the tendency of the chuck to work loose in the operation of the machine and gradually release its hold upon the work so as to permit it to vibrate to a greater or less extent, which results in an inferior or imperfect article. It is the object of my invention to overcome this difficulty by providing effectual means of simple construction for locking the chuck jaws in holding or clamping engagement with the work.

In the accompanying drawings, Figure 1 is a fragmentary front elevational view of a lathe carriage with the work holding means thereon.

Fig. 2 is a fragmentary vertical sectional view through the carriage taken approximately in the plane of line 2—2 of Fig. 1.

Fig. 3 is a fragmentary sectional view taken approximately in the plane of line 3—3 of Fig. 2 and illustrating details of construction of the chuck.

Fig. 4 is a fragmentary vertical sectional view taken approximately in the plane of line 4—4 of Fig. 2 on an enlarged scale and illustrating the chuck-locking means.

Fig. 5 is a fragmentary horizontal sectional view taken approximately in the plane of line 5—5 of Fig. 2 but on an enlarged scale.

Fig. 6 is a fragmentary vertical sectional view taken approximately in the plane of line 6—6 of Fig. 1.

The carriage which in the present instance supports the work holding means, is indicated by the numeral 7. This carriage is in practice mounted for movement relative to a cutter (not shown) mounted to turn on a fixed axis, all in a manner well understood in the art.

The work holding means comprises generally a stock center 8 and a chuck 9 both of which are arranged to be rotated to position the work with respect to the cutter. The center 8 is shown as being rigid with a spindle 10 mounted in a bearing 11 and communicating with a source of power through the medium of a worm 12, a worm wheel 13 and a shaft 14. The chuck 9 is arranged to be driven synchronously with the stock center 8 by a shaft 15, connected at its opposite ends with the spindle 10 and the chuck by means of spur gearing 16 and 17 respectively. 18 designates generally a means for facilitating the operation of centering the work with respect to the stock center 8. Such means is made the subject of my copending application Serial No. 701,273, filed March 24, 1924.

The chuck 9 (Figs. 2 and 5) comprises a pair of radially slidable jaws 19 mounted for movement in suitable ways 20 carried upon the inner face of the chuck body. Said body comprises a disk 21 centrally apertured as at 22, and rigidly secured, as by means of bolts 23, upon the inner face of a ring 24 (Fig. 3). The ring 24 in turn is rigidly secured upon the forward face of a second ring 25 which is journaled in a head 26 formed in an upwardly and rearwardly extending arm 27 adjustably mounted on the carriage in any suitable way.

On the outer side of the bearing head 26, the second ring 25 is provided with spur gear teeth 28 forming part of the gear train 17 whereby the chuck is driven from the shaft 15. The first mentioned ring 24 also has formed thereon peripheral spur teeth 29 meshing with a spur pinion 30 (Fig. 4) loose on a crank shaft 31 which is also journaled in the bracket arm 27 provided with a bearing 32 for this purpose. Splined on said shaft 31 is a spur pinion 33 which meshes with spur gear teeth 34 on the periphery of a ring 35 (Fig. 5). Said ring 35 is mounted in a rabbet groove 36 in the ring 24. Said ring 35 has upon its forward face spiral gear teeth 37 (Fig. 5) which mesh with similar teeth 38 on the rear face of each of the jaws 19 (Fig. 6). By the rotation of the crank shaft 31 it will be apparent, the ring 35 may be rotated through the spur pinion 33 and gear teeth 34 so as to cause the jaws 19 to slide radially in their ways 20 into and out of clamping engagement with the work, which is indicated at $a$ (Figs. 2 and 6).

Referring now to Fig. 4, the crank shaft 31 is mounted in a bushing or sleeve 39 in the bearing head 32, the rear end of said sleeve being flanged as at 40. At its forward end the shaft 31 is provided with a nut 41 between which and the spur pinion 33 is interposed a coiled expansion spring 42. The opposite end of the shaft 31 has a head 43 upon which is mounted a crank 44 whereby the shaft may be rotated manually. Said crank is pivotally mounted on the head 43 by means of a bolt 45, and is formed with a cam nose 46 which in the pivotal movement of the crank upon its axis is arranged to engage with the face of the flange 40 so as to draw the shaft 31 outwardly, place the spring 42 under tension, and cause the spur pinion 33 to engage frictionally with the spur pinion 30, thus in effect locking the pinions 33 and 30 together.

By this construction, it will be evident, when the work has been inserted into the chuck and the crank 44 operated to cause the jaws 19 to move into clamping engagement with the work, the spur pinions 30 and 33 may be locked together with the result that the jaw adjusting ring 35 is also locked with respect to the ring 24 connected with the driving mechanism. The pinion 30, it will be observed, through its engagement with the ring 24 serves when locked to the gear 33 as a connection between the adjusting means and the chuck body.

The pivotal connection between the crank 44 and the head 43 of the shaft 31 is herein shown as comprising a slot 44ª in the crank. The purpose of this slot is to enable the operator to reduce the throw of the crank when this is rendered desirable by the size of the work passing through the chuck. In locking the chuck, the crank is moved upwardly until the bolt 45 engages the lower end of the slot and then the crank is turned on the bolt as an axis into the dotted line position shown in Fig. 1.

To enable the chuck 9 to be rotated manually for the purpose of adjusting the initial position of the work with respect to the cutter, there is provided a manual adjusting means comprising a shaft 47 mounted in a bearing 48 suitably supported by a bracket 49 on the carriage and having fast upon its outer end a crank 50. Upon its opposite end the shaft is connected by bevel gearing 51 with the shaft 15.

I claim as my invention:

1. The combination with a chuck comprising a pair of radially movable jaws, adjusting means for the jaws including an adjusting ring, and means for rotating the chuck; of means operable to connect said adjusting ring to the chuck rotating means comprising a member having a gearing connection with the adjusting ring to move it, a second member having a gearing connection with the chuck rotating means, and means for frictionally locking said members together.

2. The combination with a chuck comprising a pair of radially movable jaws, adjusting means for the jaws including an adjusting ring, and means for rotating the chuck; of means operable to connect said adjusting ring to the chuck rotating means comprising a member having a gearing connection with the adjusting ring to move it, a second member having a gearing connection with the chuck rotating means, a shaft upon which said members are mounted, one of said members being non-rotatably mounted on the shaft and the other one of said members being loose on the shaft, and means operable to cause said members to engage frictionally whereby to lock them together.

3. The combination with a chuck comprising a pair of radially movable jaws, adjusting means for the jaws including an adjusting ring, and means for rotating the chuck; of means operable to connect said adjusting ring to the chuck rotating means comprising a member having a gearing connection with the adjusting ring to move it, a second member having a gearing connection with the chuck rotating means, a shaft upon which said members are mounted, one of said members being non-rotatably mounted on the shaft and the other one of said members being loose on the shaft, and cam means operable to cause said members to engage frictionally whereby to lock them together.

4. The combination of a rotary chuck having work clamping means, a support on which the chuck is rotatably mounted, means for adjusting said clamping means relative to the work, and means carried by said chuck support operatively associated with said adjusting means for locking the clamping means in operative position.

5. The combination of a rotary chuck body having work clamping means thereon, adjusting means for said clamping means, and cam operated means for connecting said adjusting means frictionally to said body whereby to hold the adjusting means and thereby the clamping means relative to said body.

6. The combination with a chuck comprising an apertured disk, a pair of jaws slidable on said disk, means for operating said jaws into clamping engagement with the work passing through the disk including an adjusting ring, and a spur gear rigid with said disk, of means operable to hold said adjusting ring against movement in said disk comprising a shaft having a gearing connection with the adjusting ring, a pinion on said shaft meshing with said spur gear, and means for locking said pinion to the shaft.

7. The combination of a chuck body having work clamping means thereon, adjusting means for said clamping means including a gear member, a second gear member arranged to be rotated with said body, means for locking said gear members together comprising a shaft upon which the gear members are mounted, and means including a cam for causing said members to engage frictionally so as to rotate together.

8. The combination of a chuck body having work clamping means thereon, adjusting means for said clamping means including a gear member, a second gear member arranged to be rotated with the body, means for locking said gear members together comprising a shaft upon which said gear members are mounted, a sleeve in which said shaft is journaled, and a crank pivoted on the shaft and having a cam rigid therewith adapted to engage with said sleeve whereby to cause said gear members to frictionally engage with each other.

9. The combination of a chuck body having work clamping means thereon, adjusting means for said clamping means including a gear member, a second gear member arranged to be rotated with the body, means for locking said gear members together comprising a shaft upon which one of said gear members is non-rotatably mounted and upon which the other one of said gear members is journaled, and means including a spring for holding said members in frictional engagement.

10. The combination with a chuck having an apertured body, a pair of jaws slidable on said body, and means for moving said jaws into clamping engagement with work passing through the body including a rotary adjusting ring, of gear means operable to rotate said ring, a gear rotated by said body, and means for locking said gear means and gear together.

11. The combination of a chuck body having work-clamping means thereon, a support in which said body is mounted for rotation, means for rotating said body, a gear element rigid with the body, an adjusting ring for said work-clamping means rotatable relative to the body, an axially movable shaft journalled in said support and having a gear connection with said adjusting ring, and means operable in the axial movement of said shaft for locking said gear element and said adjusting ring against relative rotation.

12. The combination of a chuck body, a support in which said body is mounted for rotation, work-clamping means carried by the body, means for adjusting the work-clamping means including an adjusting ring, an adjusting element mounted on said support and having a gearing connection with said ring, and means providing a connection between said adjusting element and the chuck body for rotation therewith, whereby to lock the adjusting ring against movement relative to the chuck body.

13. The combination of a chuck body having work-clamping means adjustable therein, a support in which said body is rotatably mounted, means for operating said adjusting means including a gear element mounted in said support, a second gear element arranged coaxially of the first gear element and arranged to be driven in the rotation of the chuck body, and means operable to lock said gear elements together.

14. The combination of a chuck body having work-clamping means adjustable therein, a support in which said body is rotatably mounted, means for operating said adjusting means including a gear element mounted in said support, a second gear element arranged coaxially of the first gear element and arranged to be driven in the rotation of the chuck body, and means operable to lock said gear elements together comprising a shaft with which the first gear element is rigidly secured and on which the second gear element is rotatably mounted, and an operating device for clamping said gear elements together.

15. The combination with a chuck body having work-clamping means adjustable therein and a support in which the body is rotatably mounted; of combined means for adjusting said clamping means and for locking the clamping means against movement relative to the body including an operating device mounted on said support.

16. The combination of a chuck body having work clamping means thereon, a support in which said body is rotatably mounted, an adjusting ring for said work clamping means rotatable relative to the body and having peripheral gear teeth thereon, and a shaft journaled in said support having a gear meshing with said adjusting ring gear teeth and carrying a manual control handle operable to actuate said work clamping means.

17. The combination with means for supporting and rotating a chuck, of a chuck comprising a body adapted to be attached to said means, a pair of radially movable jaws thereon, and adjusting means for the jaws including an adjusting ring normally constrained to rotate with the body, and means mounted independently of the chuck operable further to constrain said adjusting ring to rotate with the chuck, said means comprising a member connected to said adjusting ring, a second member connected to said body, and means for clamping said members together.

18. The combination of a chuck body having work clamping means thereon, adjusting means for said clamping means normally rotating with the body, and including a gear member connected thereto, a second gear member having a gearing connection with the body so as to be rotated thereby, and means movable axially of said gear members for clamping said gear members together whereby to cause said adjusting means to rotate with the body.

19. In combination, a chuck having an apertured body, a plurality of jaws slidable radially on said body, means for moving said jaws into clamping engagement with work passing through the body including a rotary adjusting ring having gear teeth thereon, means for rotatably mounting said chuck, a shaft rotatably mounted independently of said chuck on a stationary axis parallel to the axis of the chuck and carrying a gear meshing with said teeth and a control lever operable to rotate said shaft to open and close said jaws.

In testimony whereof, I have hereunto affixed my signature.

CARL LAWRENCE MATTISON.